United States Patent
Yao et al.

(10) Patent No.: US 11,110,949 B2
(45) Date of Patent: Sep. 7, 2021

(54) MOVABLE CONTAINER

(71) Applicant: LINGDONG TECHNOLOGY(BEIJING) CO. LTD., Beijing (CN)

(72) Inventors: Bohan Yao, Beijing (CN); Yue Wu, Beijing (CN); Herrickhui Yaozhang, Beijing (CN)

(73) Assignee: LINGDONG TECHNOLOGY (BEIJING) CO. LTD., Beijing (CN)

( * ) Notice: Subject to any disclaimer, the term of this patent is extended or adjusted under 35 U.S.C. 154(b) by 0 days.

(21) Appl. No.: 16/718,088

(22) Filed: Dec. 17, 2019

(65) Prior Publication Data
US 2021/0061335 A1 Mar. 4, 2021

Related U.S. Application Data

(63) Continuation of application No. 16/088,657, filed on Aug. 31, 2019.

(51) Int. Cl.
*B62B 3/00* (2006.01)
*B62B 5/00* (2006.01)
(Continued)

(52) U.S. Cl.
CPC .............. *B62B 5/0069* (2013.01); *A45C 5/14* (2013.01); *A45C 13/262* (2013.01); *B62B 3/02* (2013.01); *B62B 5/0033* (2013.01); *B62B 5/067* (2013.01); *G05D 1/0246* (2013.01); *G05D 1/12* (2013.01); *G06T 7/246* (2017.01); *G06T 7/50* (2017.01);
(Continued)

(58) Field of Classification Search
CPC ........... A45C 7/0018; A45C 5/00; A45C 5/14; A45C 13/28
See application file for complete search history.

(56) References Cited

U.S. PATENT DOCUMENTS 5,126,719 A    6/1992  DeScorbo
5,355,980 A *  10/1994 Hsieh ....................... A45C 5/14
                                                      16/113.1
(Continued)

FOREIGN PATENT DOCUMENTS

CN      2355596 Y     12/1999
CN    203217408 U      9/2013
(Continued)

OTHER PUBLICATIONS

Office Action dated Jun. 17, 2020 issued for U.S. Appl. No. 16/088,657.
(Continued)

*Primary Examiner* — Hau V Phan
(74) *Attorney, Agent, or Firm* — WPAT, P.C.; Anthony King

(57) ABSTRACT

A movable container includes an outer shell, a handle tube and a case. A surface of the outer shell includes a first part and a second part, and a height deviation locates between the first part of the surface and the second part of the surface toward a normal direction of the surface. The handle tube is located between the first part of the surface and the second part of the surface, and a part of a handle of the movable container is embedded in the handle tube. The case covers the handle tube and attaches to the surface via an attachment mechanism.

13 Claims, 12 Drawing Sheets

(51) Int. Cl.
   G05D 1/02     (2020.01)
   A45C 13/26    (2006.01)
   B62B 3/02     (2006.01)
   B62B 5/06     (2006.01)
   G05D 1/12     (2006.01)
   A45C 5/14     (2006.01)
   G06T 7/246    (2017.01)
   G06T 7/50     (2017.01)
   G06T 7/73     (2017.01)
   H02B 1/20     (2006.01)

(52) U.S. Cl.
   CPC ........... *G06T 7/73* (2017.01); *G05D 2201/02* (2013.01); *H02B 1/20* (2013.01)

(56) References Cited

U.S. PATENT DOCUMENTS

| | | | |
|---|---|---|---|
| 5,943,936 A * | 8/1999 | Deliman | A45C 13/262 16/113.1 |
| 6,563,568 B2 * | 5/2003 | Pierrat | G03F 7/70066 355/77 |
| 7,021,437 B2 | 4/2006 | Ghiassi | |
| 7,218,225 B2 * | 5/2007 | Wieth | G07F 7/0636 186/62 |
| 8,434,577 B1 * | 5/2013 | Al-Qaffas | A45C 13/24 180/65.1 |
| 8,901,442 B1 | 12/2014 | Dilone | |
| 9,027,722 B1 | 5/2015 | Parker | |
| 9,487,356 B1 * | 11/2016 | Aggarwal | B65G 1/0464 |
| 10,116,130 B2 * | 10/2018 | Shibuya | H02B 3/00 |
| 2004/0182063 A1 | 9/2004 | Myers et al. | |
| 2011/0048882 A1 * | 3/2011 | Chiang | A45C 7/0036 190/107 |
| 2012/0152677 A1 * | 6/2012 | Lu | A45C 5/14 190/18 A |
| 2013/0008753 A1 * | 1/2013 | Moon | A45C 5/14 190/18 A |
| 2014/0107868 A1 * | 4/2014 | DiGiacomcantonio | A45C 5/14 701/2 |
| 2014/0277841 A1 * | 9/2014 | Klicpera | A45C 13/385 701/2 |
| 2016/0150862 A1 * | 6/2016 | Tonelli | A45C 13/262 190/18 A |
| 2016/0328900 A1 * | 11/2016 | Yong | G07C 9/00571 |
| 2017/0049202 A1 | 2/2017 | Nascimento | |

FOREIGN PATENT DOCUMENTS

| | | |
|---|---|---|
| CN | 104824944 A | 8/2015 |
| CN | 206043762 U | 3/2017 |
| CN | 206150680 U | 5/2017 |
| CN | 107173943 A | 9/2017 |
| CN | 107212547 A | 9/2017 |
| CN | 108433315 A | 8/2018 |
| JP | 2002321624 A | 11/2002 |

OTHER PUBLICATIONS

English Abstract Translation of Foreign Reference CN107212547A.
English Abstract Translation of Foreign Reference CN104824944A.
English Abstract Translation of Foreign Reference CN206043762U.
English Abstract Translation of Foreign Reference CN107173943A.
English Abstract Translation of Foreign Reference CN206150680U.
English Abstract Translation of Foreign Reference CN108433315A.
International Search Report Form PCT/ISA/210 and Written Opinion of PCT/CN2018/106086.
Office action of counterpart China application 201880005156.5 dated Jan. 5, 2021.
English abstract translation of the office action of counterpart China application 201880005156.5 dated Jan. 5, 2021.
English abstract translation of CN107212547A.
English abstract translation of CN2355596Y.
English abstract translation of CN203217408U.
English abstract translation of JP2002321624A.

* cited by examiner

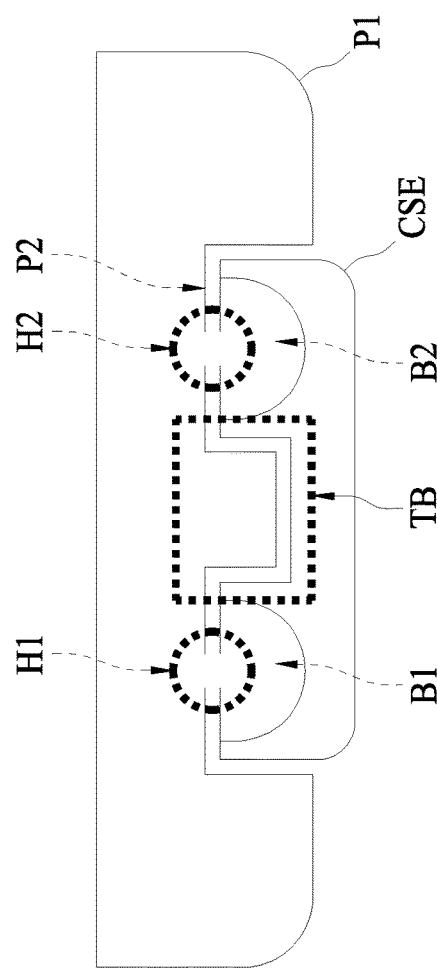
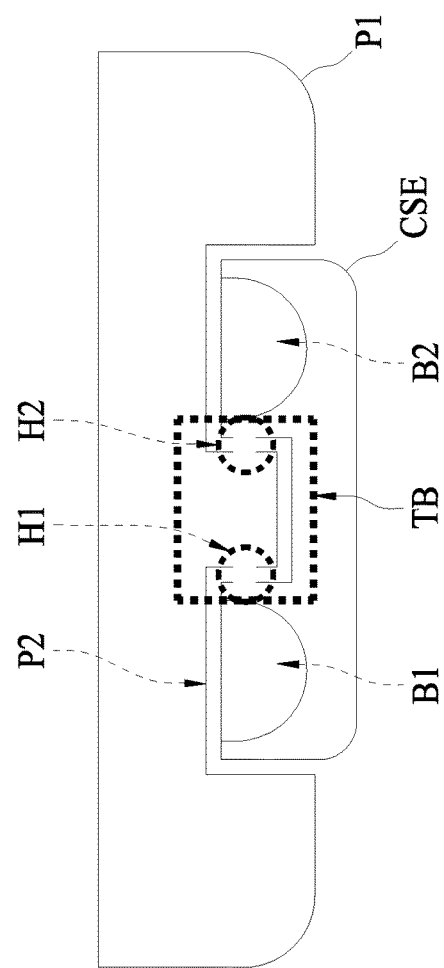
FIG. 7A
FIG. 7B

MOVABLE CONTAINER

CROSS-REFERENCE TO RELATED APPLICATION

This application is a continuation of U.S. patent application Ser. No. 16/088,657, entitled "MOVABLE CONTAINER" filed on Aug. 31, 2019, which is incorporated herein by reference.

BACKGROUND

For a smart luggage, a battery is a must part therewith to support power to the smart luggage in order to perform functions such as moving or signal transmission. However, for a chargeable battery, to be checked in with the luggage in not allowed due to current aviation regulation. Therefore, a simple and convenient way to remove a battery from a smart luggage is needed.

SUMMARY OF THE INVENTION

Therefore, one of the objectives of the present disclosure is to provide a movable container to solve the aforementioned problems.

In one embodiment of the present disclosure, a movable container is disclosed. The movable container includes an outer shell, a handle tube and a case. A surface of the outer shell includes a first part and a second part, and a height deviation locates between the first part of the surface and the second part of the surface toward a normal direction of the surface. The handle tube is located between the first part of the surface and the second part of the surface, and a part of a handle of the movable container is embedded in the handle tube. The case covers the handle tube and attaches to the surface via an attachment mechanism.

In one embodiment of the present disclosure, a movable container is disclosed. The movable container includes a shell and a single rod handle. The shell is designed to receive a shock. The shell includes at least two different portions joined together and respectively made with different materials, wherein a joining area between the at least two different portions creates a compartment. The single rod handle between the shell and interior of the movable container, wherein the compartment being adjacent to a placement of the single rod handle, and is divided into two sub-compartments by the single rod handle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A and FIG. 7B are diagrams illustrating locations of openings according to an embodiment of the present disclosure.

DETAILED DESCRIPTION

Figure 1:
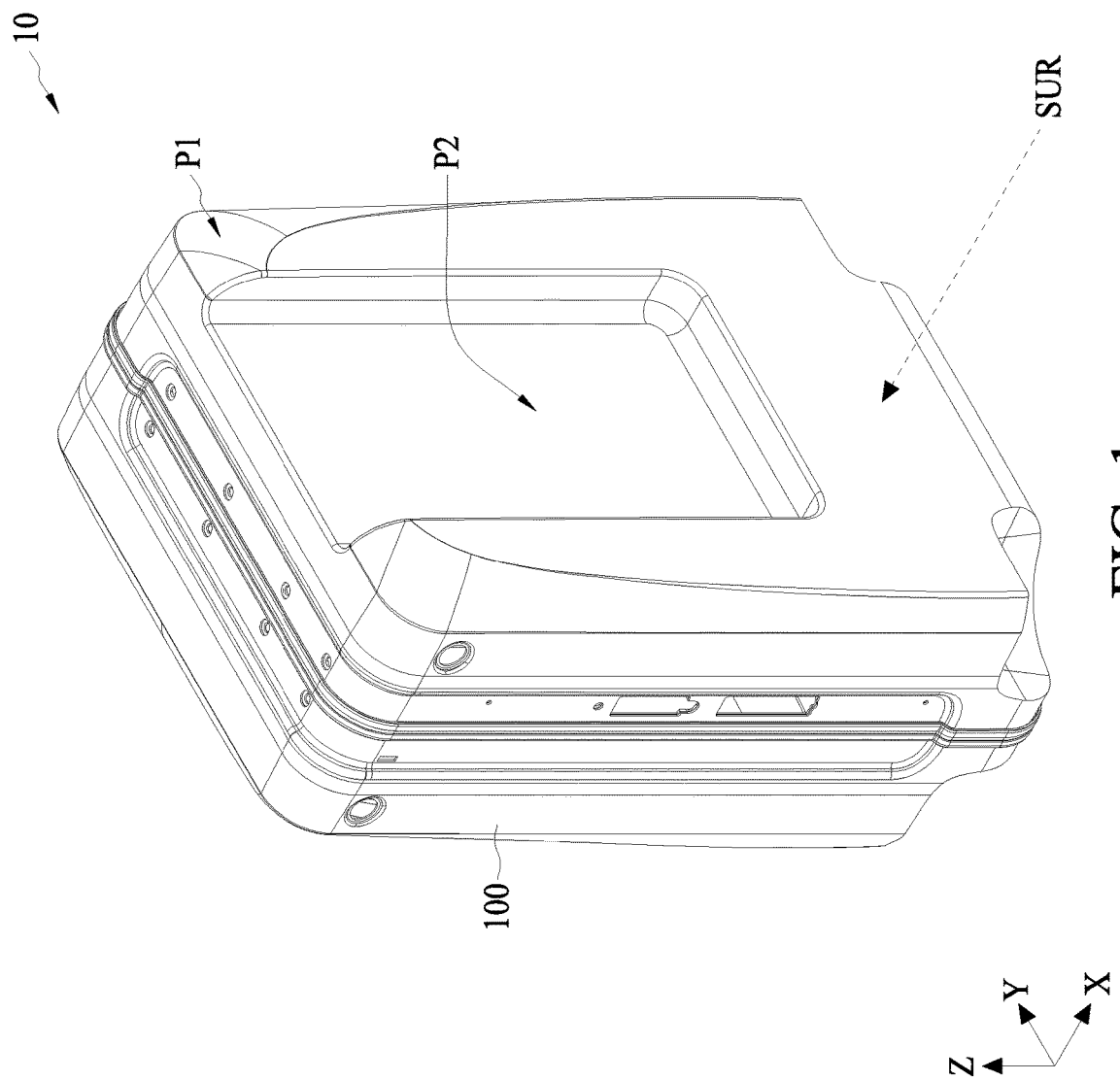
FIG. 1 is a diagram illustrating an outer shell of a movable container according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

In the present disclosure, a simple and convenient way to remove a battery from a smart luggage is provided. A novel design to have a battery detachably disposed on the smart luggage can effectively utilize remaining space adjacent to the handle without sacrificing much storage room of the luggage.

FIG. 1 is a diagram illustrating an outer shell 100 of a movable container 10. A surface SUR of the outer shell 100 includes a first part P1 and a second part P2. As shown in FIG. 1, a height deviation exists between the first part P1 and the second part P2 on the x direction. In other words, the second part P2 can be seen as a recess of the outer shell 100.

Figure 2:
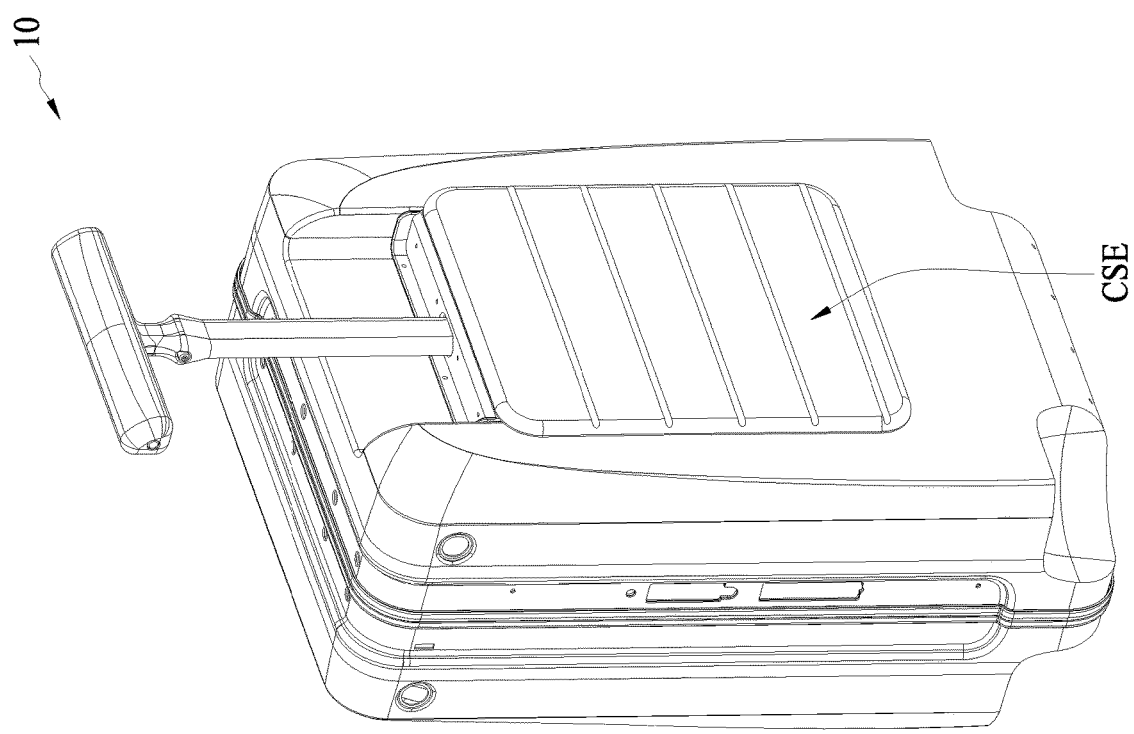
FIG. 2 is a diagram illustrating a handle and a case of a movable container according to an embodiment of the present disclosure.
Figure 2:
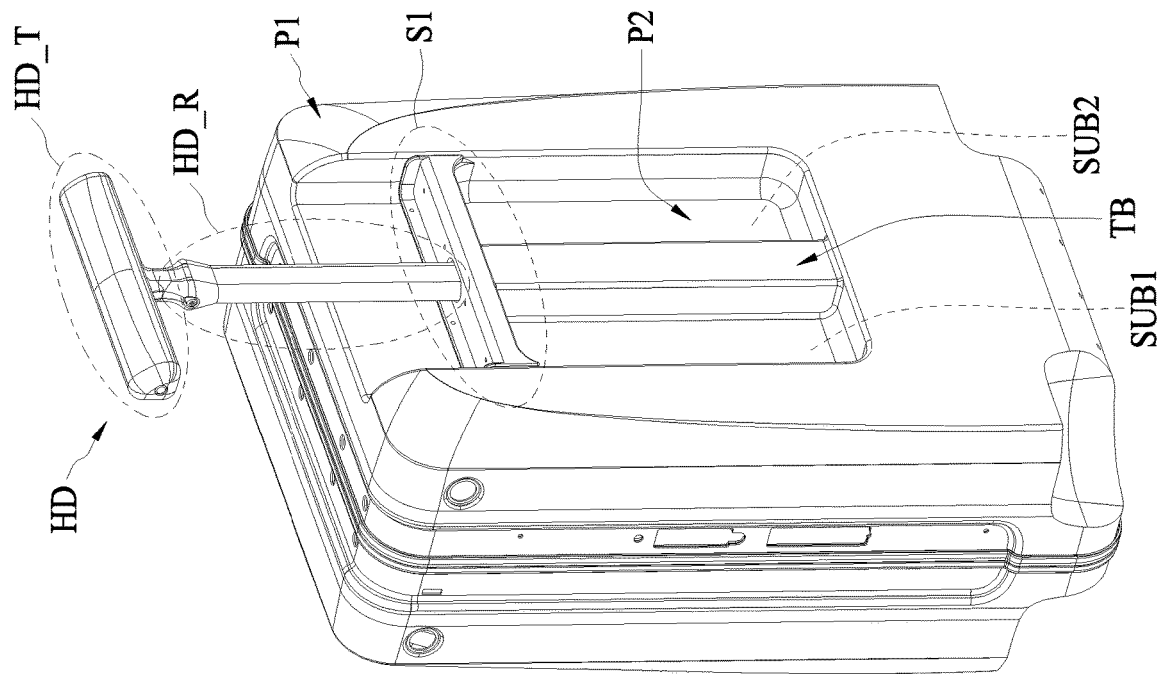

FIG. 2 is a diagram illustrating a handle HD and a case CSE of the movable container 10 according an embodiment of the present disclosure. Referring to the left of FIG. 2, the handle HD includes a top HD_T and a rod HD_R, and the rod HD_R is embedded in a handle tube TB. The handle tube TB is located between the first part P1 and the second part P2 of the surface SUR of the outer shell 10. In this embodiment, the handle HD is stretchable. When the handle HD is retrieved from stretch, the rod HD_R is fully embedded in the tube TB while the top HD_T is below or level with the top surface of the outer shell 100 and above a handle-top receiving structure S1 of the outer shell 100. The handle-top receiving structure S1 can be seen as a part of the part P1. As shown in FIG. 2, the handle tube TB preferably equally divides the compartment surrounded by the first part P1 and the second part P2, and two sub-compartments SUB1 and SUB 2 are formed adjacent to the tube TB. Referring to the right of FIG. 2, the case CSE covers the tube TB and the sub-compartments SUB1 and SUB2. The outer shell 100 and the case CSE are made of different materials. The case CSE is made by a material whose hardness is relatively lower than the material used to make the outer shell 100. With such configurations, when the movable container 10 is suffered from collision, the case CSE mitigates the shock to prevent stuff (e.g., battery or electronic device) stored between the case CSE and the outer shell 100 from being damaged because the case CSE is made of material with relative lower hardness than that of the outer shell 100 so that the case CSE is able to absorb the impact and the vibration caused by the shock.

Figure 3:
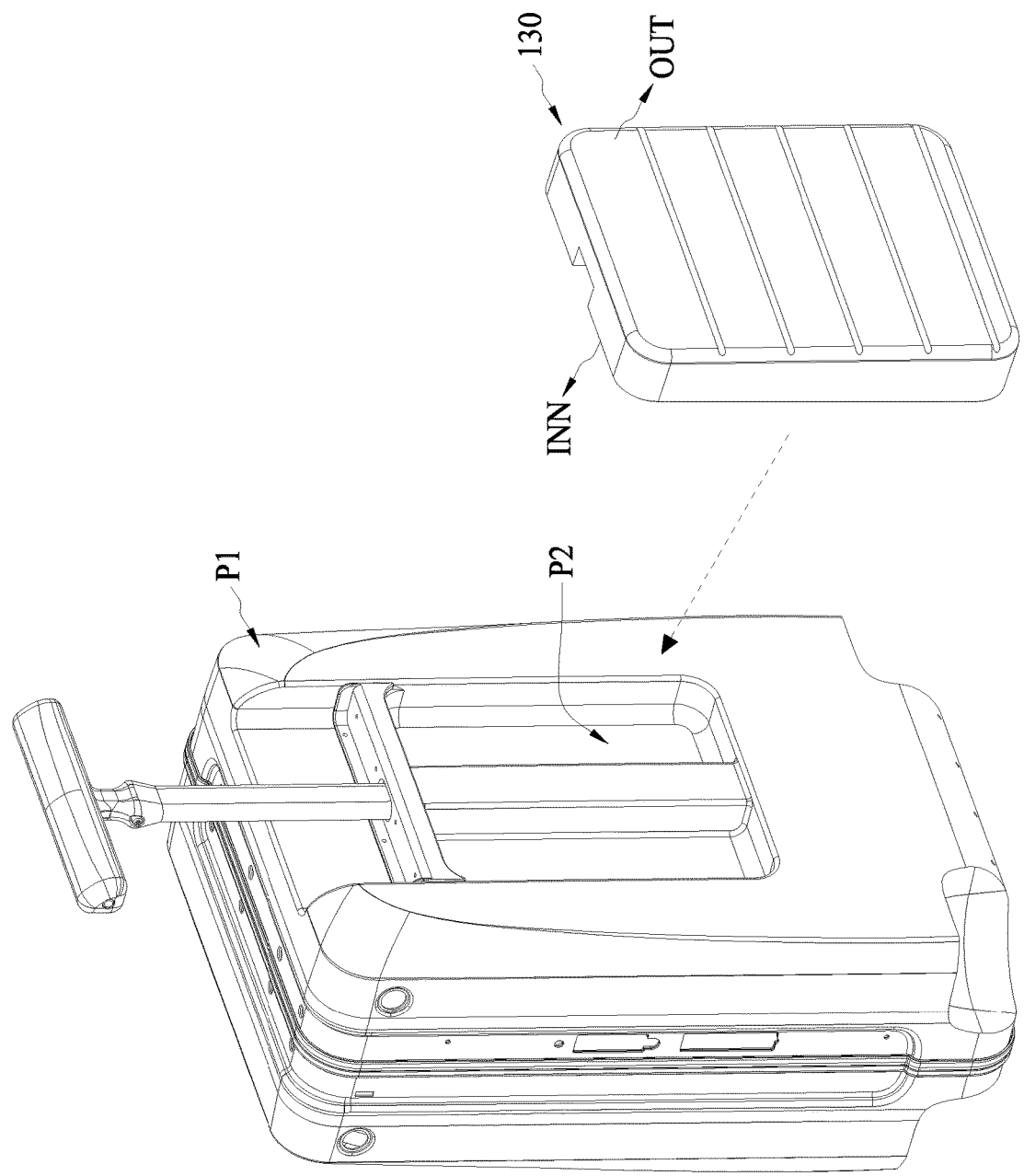
FIG. 3 is a diagram illustrating a case attached to a surface of the movable container according to an embodiment of the present disclosure.
Figure 4:
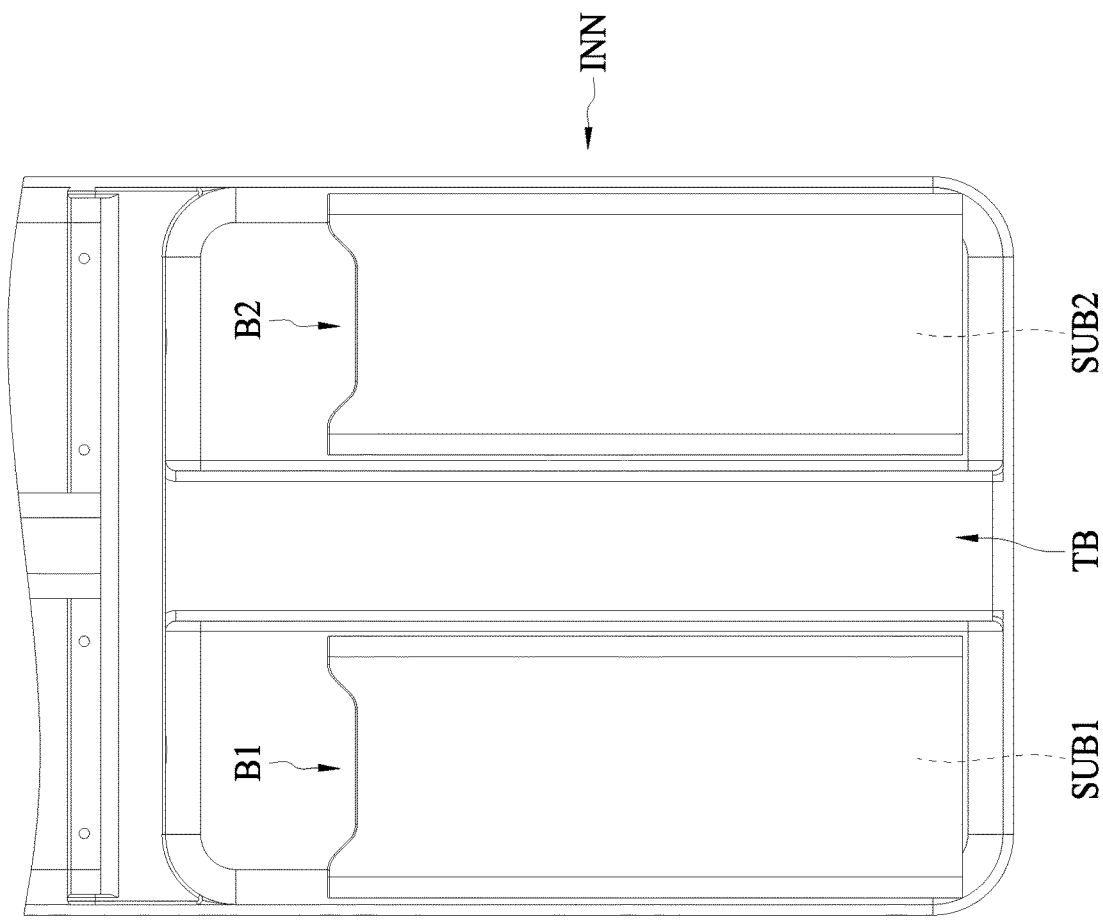
FIG. 4 is a front view diagram illustrating an inner part of a case according to an embodiment of the present disclosure.

FIG. 3 is a diagram illustrating the case CSE attached to the surface SUR of the movable container 10 according to an embodiment of the present disclosure. As shown in FIG. 3, the case CSE includes an inner part INN and an outer part OUT, and the inner part INN is attached to the surface SUR of the outer shell 100 via an attachment mechanism. In this embodiment, the attachment mechanism includes an adhesive. In other words, the inner part INN is glued to the outer shell 100 (in particular, to the second part P2 of the surface SUR and the handle tube TB). FIG. 4 is a front view diagram illustrating the inner part INN according to an embodiment of the present disclosure. As shown in FIG. 4, inside the inner part INN, two storage bags B1 and B2 are sewn on the inner part and located in the sub-compartments SUB1 and SUB2 respectively for receiving stuff. At least a part of each storage bag is by an elastic band for fixing stuff stored therein to prevent the stored stuff from randomly moving. The outer part OUT is attached to the first part P1 of the surface SUR via a zipper (not shown in FIG. 4). However, this should not be a limitation of the present disclosure. In other embodiments, a buckle, a latch or a magnet is adapted for the outer part OUT being attached to the first part P1.

Figure 5:
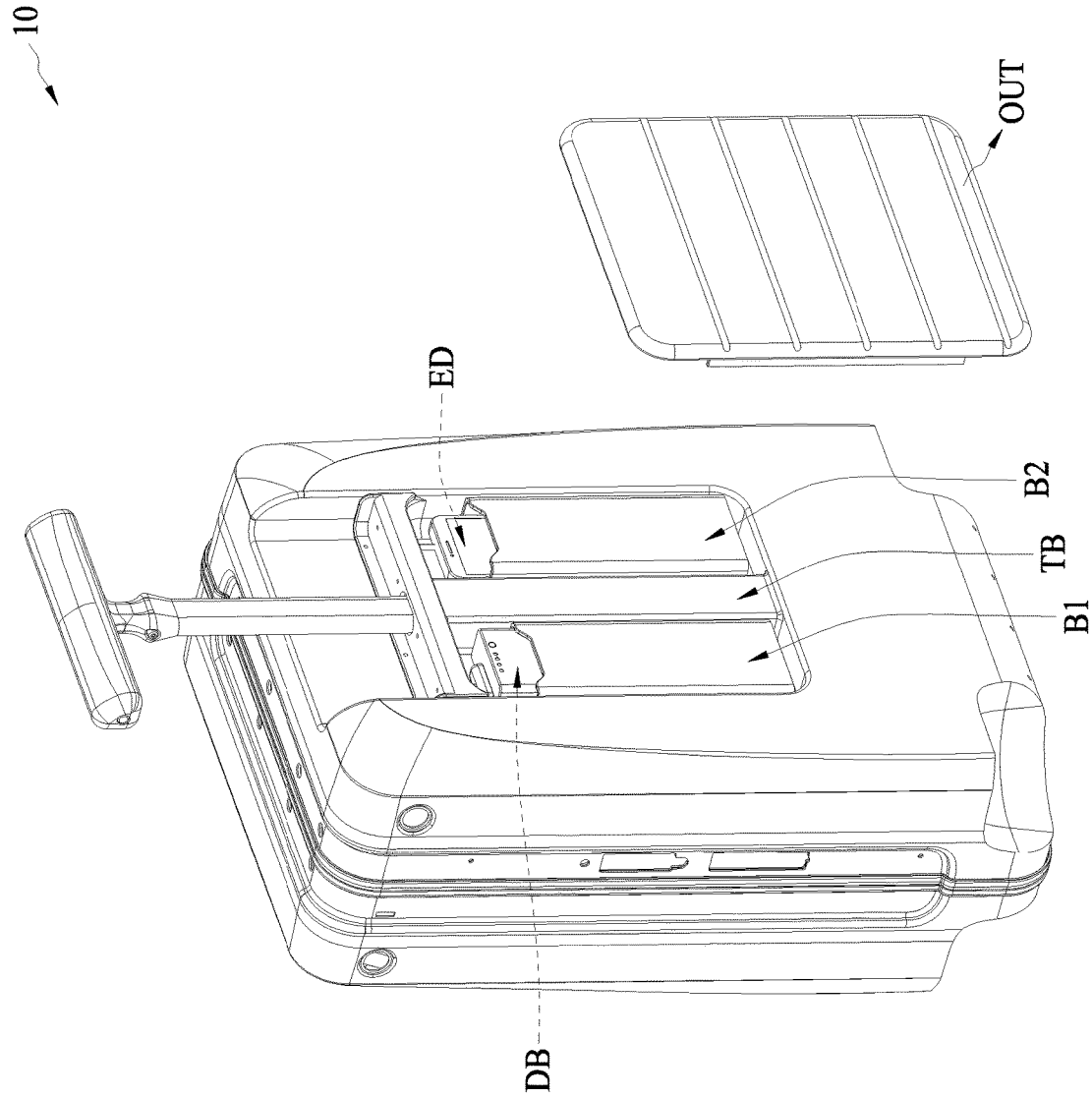
FIG. 5 is a diagram illustrating a perspective view of a case according to an embodiment of the present disclosure.

FIG. 5 is a diagram illustrating receiving stuff with the bags B1 and B2 on inner part INN of case CSE according to an embodiment of the present disclosure. As shown in FIG. 5, the bags B1 and B2 receive a detachable battery DB and a to-be-charged device such as an electronic device ED, respectively. In this embodiment, the electronic device ED is a mobile phone, personal digital assistant, or any kind of electronic computing device. In other embodiments, the to-be-charged device may be an electronic wristband or a smart watch, and such devices are associated with the movable container 10 for controlling the movable container 10. With such configurations, the electronic device ED may be charged by the detachable battery DB via a wire. However, the bags B1 and B2 are not limited to receive the detachable battery DB and the electronic device ED. By effectively utilizing the space created by the handle tube TB, the first part P1, the second part P2 and the case CSE, the detachable battery DB placed in said space can be easily taken out when it is necessary.

Figure 6:
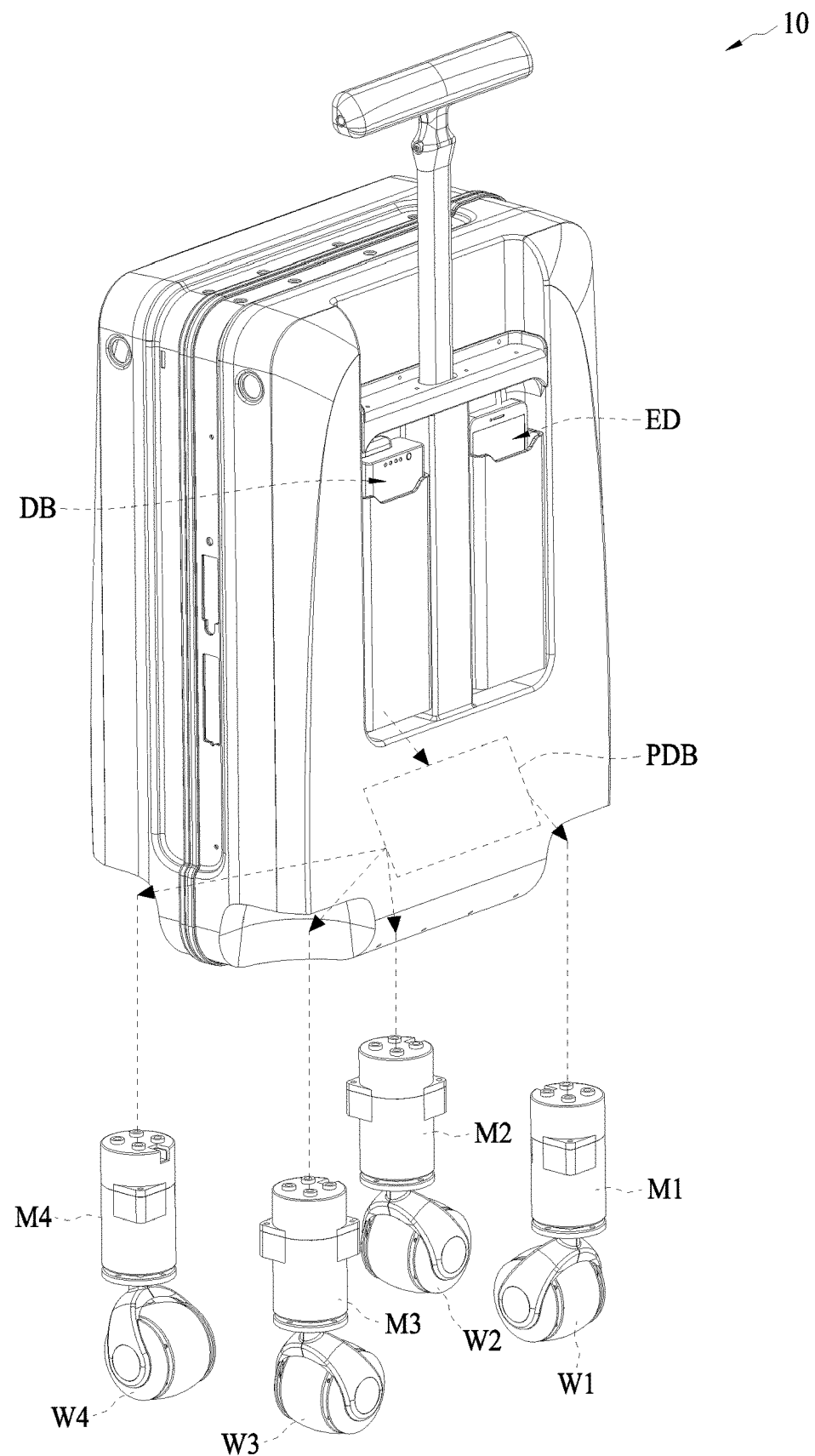
FIG. 6 is a diagram illustrating a power distribution board and motors according to an embodiment of the present disclosure.

FIG. 6 is a diagram illustrating a power distribution board PDB and motors M1 to M4 according to an embodiment of the present disclosure. The power distribution board PDB is arranged to transfer electrical power provided by the detachable battery DB. In this embodiment, the power distribution board PDB is embedded in the outer shell 100 and cannot be seen from outside. It should be noted that, the location of the power distribution board PDB is not limited by the present disclosure. In addition, the power distribution board PDB is electrically connected to the detachable battery DB via a wire through an opening. The movable container 10 further includes motor M1 to M4 associated with wheels W1 to W4. The motors M1 to M4 may be attached to the outer shell 100 by latch, buckle, or magnet. This is not a limitation of the present disclosure. The power distribution board PDB transfers the electrical power to motors M1 to M4 so that motors M1 to M4 can provide a momentum to the movable container 10 by driving wheels W1 to W4. It should be noted that the power distribution board PDB may actively adjust the electrical power supposed to be transferred to each motor. By reducing the electrical power being transferred to motors associated with inner wheels and increasing the electrical power being transferred to motors associated with outer wheels, the movable container 10 is able to make a turn.

FIG. 7A and FIG. 7B are top view diagrams illustrating locations of openings H1 and H2 for the wire connected between the power distribution board PDB and the detachable battery DB goes through according to an embodiment of the present disclosure. In FIG. 7A, the openings H1 and H2 cut through the second part P2 of the surface SUR and the inner part INN of the case CSE so that the wire connected between the power distribution board PDB and the detachable battery DB is embedded in the outer shell 100. With such configurations, the detachable battery DB can provide electrical power to inner components (e.g., the power distribution board PDB) of the movable container 10. In FIG. 7B, the openings H1 and H2 cut through the tube TB and the inner part INN of the case CSE so that the wire connected between the power distribution board PDB and the detachable battery DB is embedded in the handle tube TB.

Figure 8:
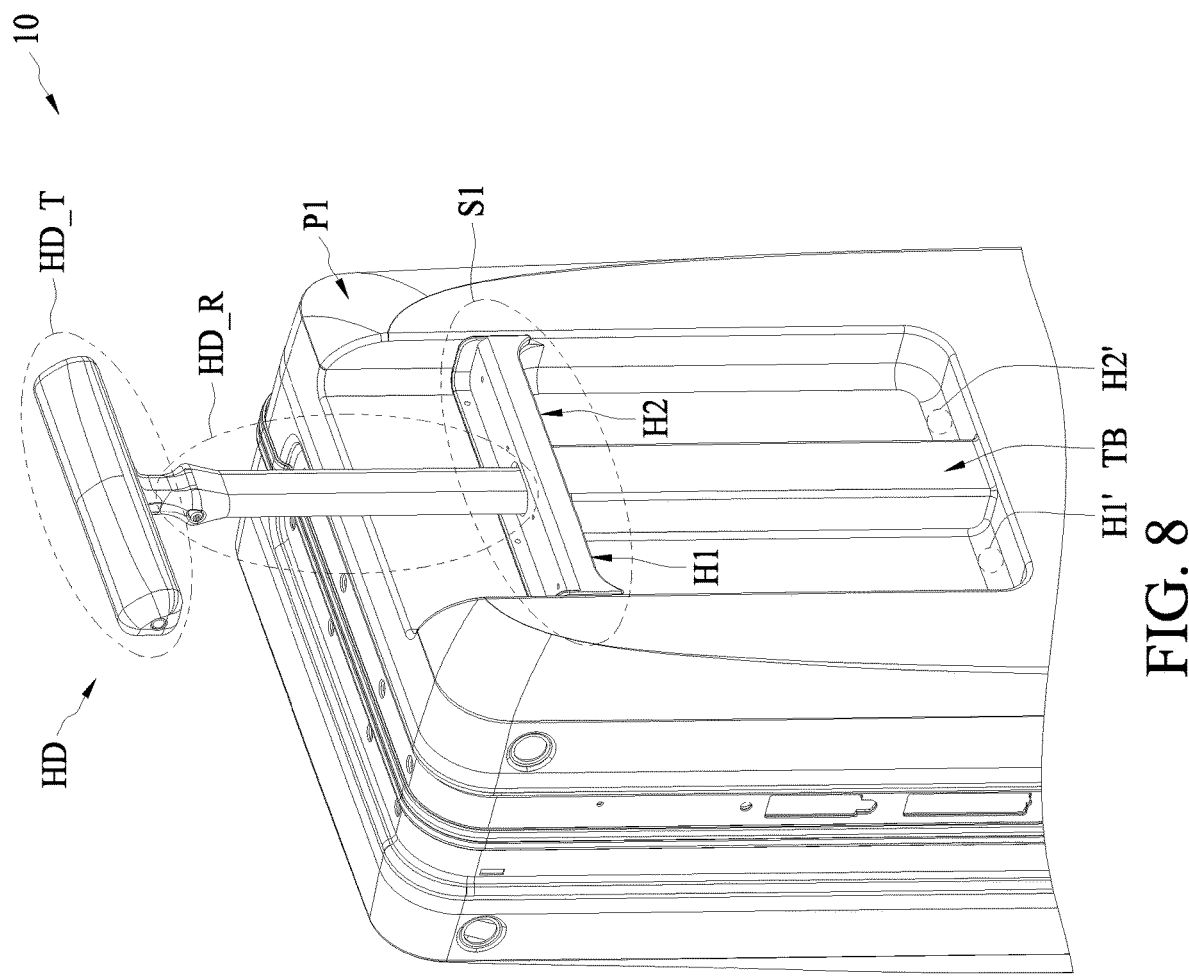
FIG. 8 is a diagram illustrating locations of openings according to another embodiment of the present disclosure.

FIG. 8 is a diagram illustrating locations of openings according to another embodiment of the present disclosure. In this embodiment, the openings for the wire connected between the power distribution board PDB and the detachable battery DB goes through are located between the first part P1 and the second part P2. For example, the openings (e.g., H1 and H2 shown in FIG. 8) cut through the bottom of the handle-top receiving structure S1 so that the wire connected between the power distribution board PDB and the detachable battery DB is embedded in the handle-top receiving structure S1. With such configurations, the detachable battery DB can provide electrical power to inner components (e.g., the power distribution board PDB) of the movable container 10. Alternatively, the openings (e.g., H1' and H2' shown in FIG. 8) cut through the sidewall of the first part P1 so that the wire connected between the power distribution board PDB and the detachable battery DB is embedded in the outer shell 100 without being seen from outside.

Figure 9:
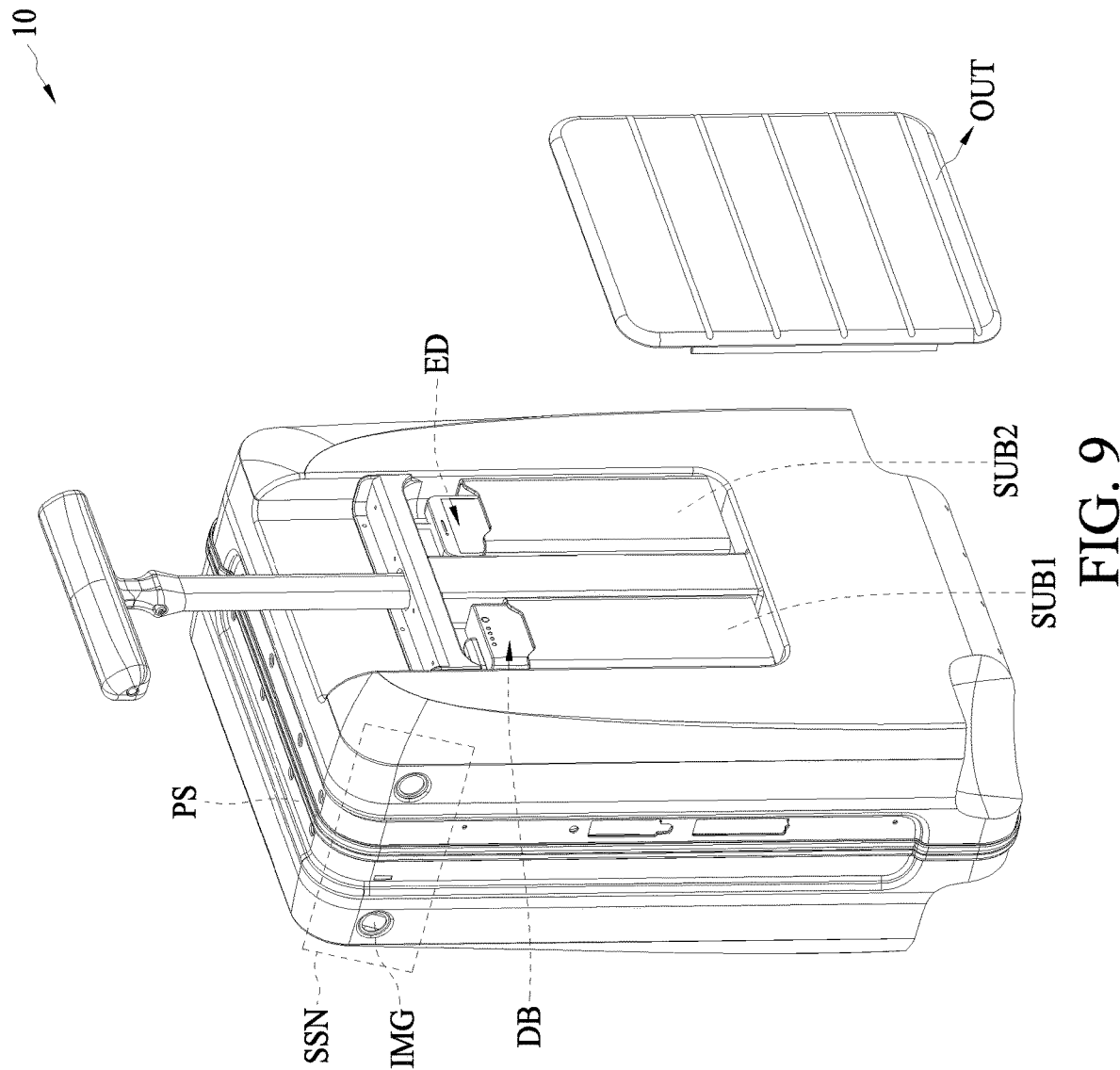
FIG. 9 is a diagram illustrating a sensing device electrically connected to a detachable battery according to an embodiment of the present disclosure.

FIG. 9 is a diagram illustrating a sensing device SSN electrically connected to the detachable battery DB according to an embodiment of the present disclosure. As shown in FIG. 9, the sensing device SSN receives electrical power from the detachable battery DB. In this embodiment, the sensing device SSN located on a side of the movable container 10 includes an image sensor IMG and a proximity sensor PS. The image sensor IMG senses a distance feature and/or a recognition feature for people-following in accordance with the momentum provided by motors M1 to M4. The proximity sensor PS is arranged to avoid the movable container 10 colliding any obstacle. With such configurations, the movable container 10 may follow a target in accordance with the distance feature and the recognition feature. The movable container 10 may further include a processing circuit (not shown in the figures) to process the distance feature and the recognition feature. However, considering the size of the movable container 10, the processing circuit installed within the movable container 10 may not have enough computing power to process the distance feature and the recognition feature. Therefore, the electronic device ED placed in the sub-compartment SUB2 may be electrically connected to the processing circuit to help the processing circuit processing the distance feature and the recognition feature with its computing power and storage unit (e.g., a memory installed within the electronic device ED). The electronic device ED and the detachable battery DB may connect to the sensing device SSN via a wire through the openings mentioned in the embodiments of FIG. 7A, FIG. 7B or FIG. 8. With such configurations, the detachable battery DB can provide electrical power to inner components (e.g., the sensing device SSN) of the movable container 10. It should be noted that, the locations of the image sensor IMG and the proximity sensor PS are not limited to be on the side of the movable container 10. In other embodiments, the image sensor IMG is installed on the top of handle HD_T or the rod of handle HD_R.

Figure 10:
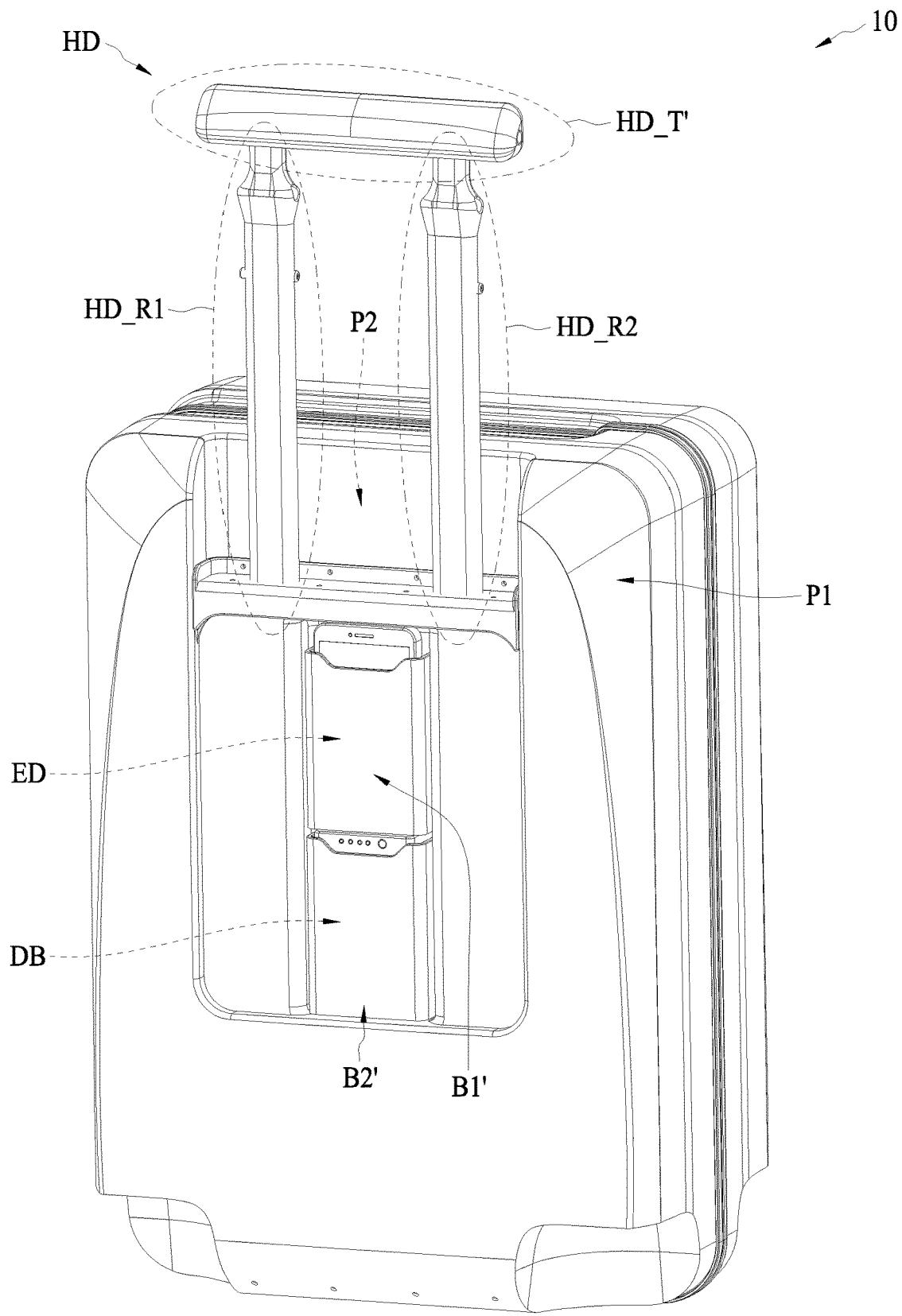
FIG. 10 is a diagram illustrating a movable container according to an embodiment of the present disclosure.

FIG. 10 is a diagram illustrating the movable container 10 according to another embodiment of the present disclosure. In this embodiment, the handle HD of the movable container 10 includes a top HD_T and two rods HD_R1 and HD_R2. With such configurations, the space created by the rods HD_R1 and HD_R2, the first part P1 and the second part P2 can be utilized to deposit the detachable battery DB and the electronic device ED as shown in FIG. 10. Accordingly, the bags B1 and B2 on the inner INN of the case CSE for depositing stuff may be designed in another way. The detail will be described in the following paragraphs.

Figure 11A:
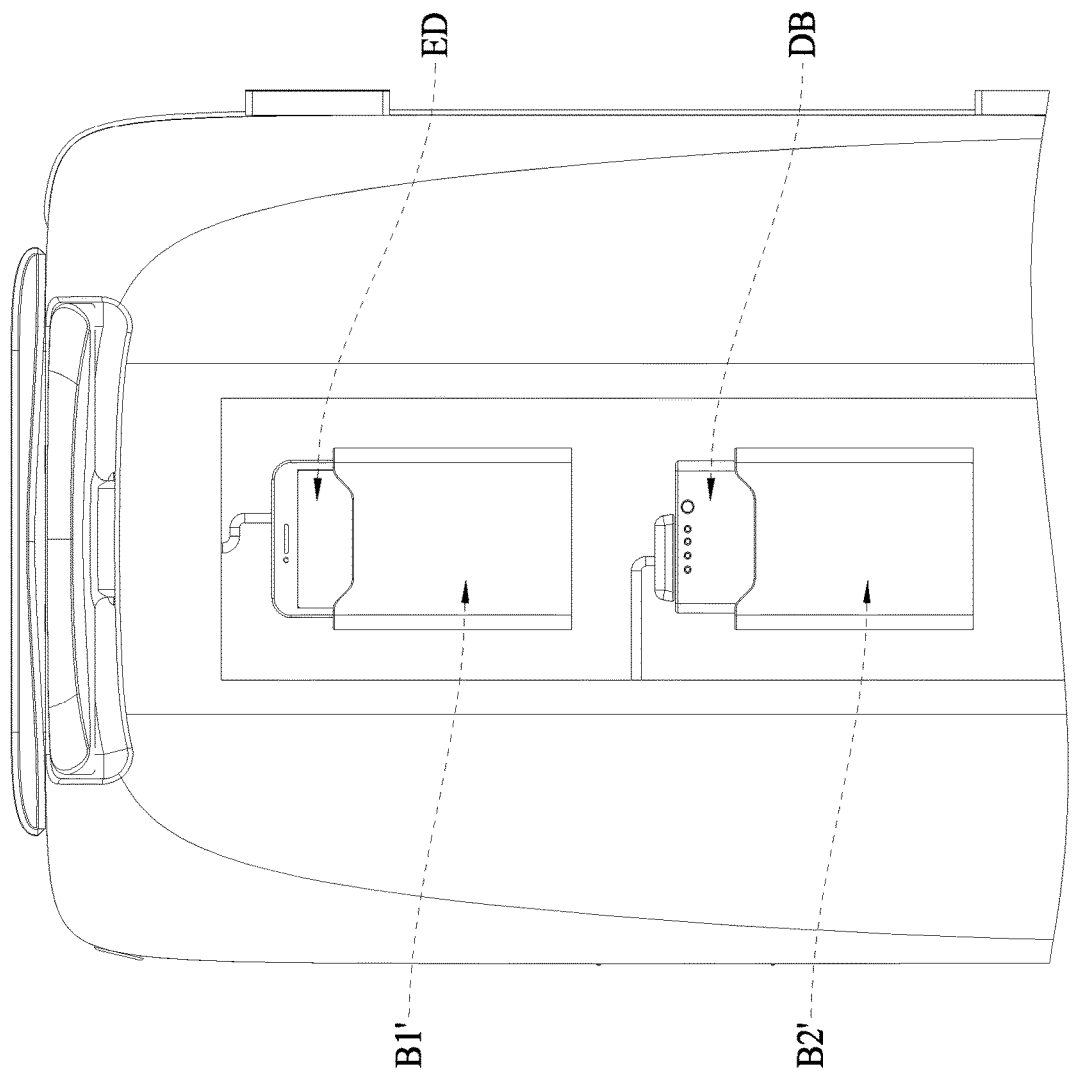
FIG. 11A, FIG. 11B and FIG. 11C are diagrams illustrating perspective views of cases according to another embodiment of the present disclosure.
Figure 11C:
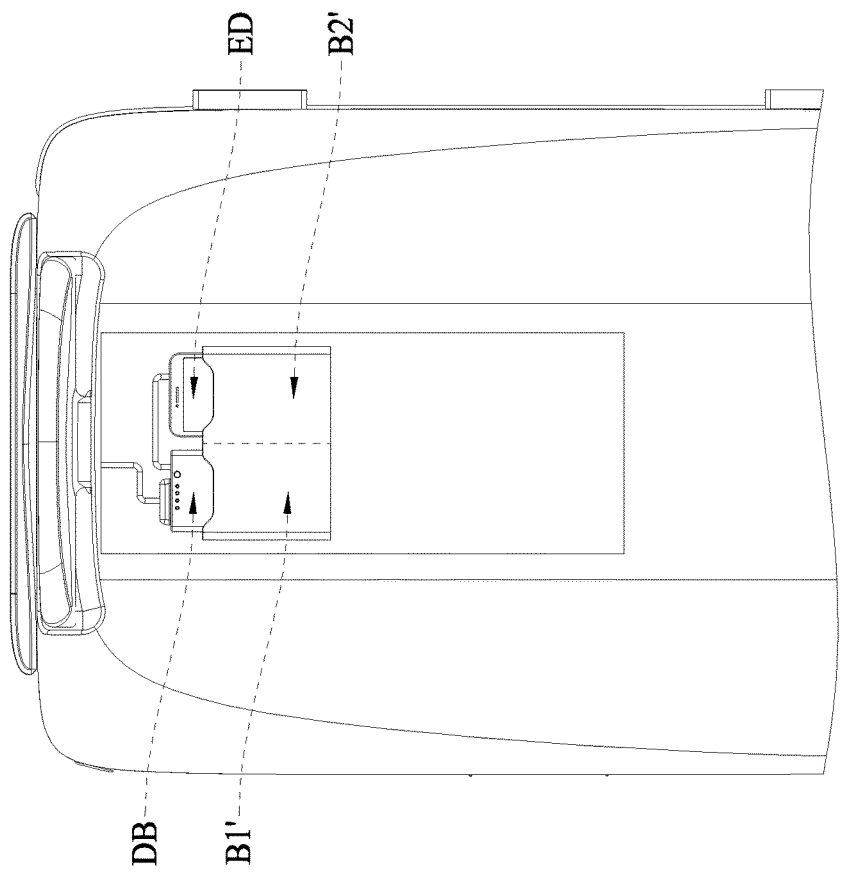
Figure 11B:
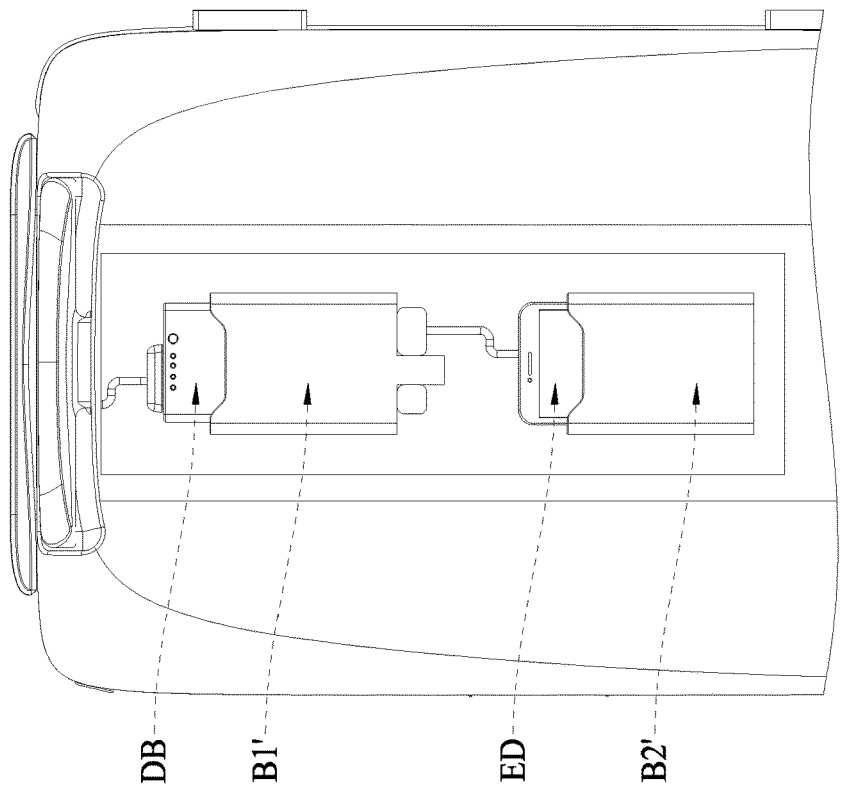

FIGS. 11A to 11C are diagrams illustrating bags B1' and B2' for depositing stuff according to another embodiment of the present disclosure. In FIG. 11A, the bags B1' and B2' are arranged in a line for receiving the detachable battery DB and the electronic device ED. In FIG. 11B, the arrangement of the bags B1' and B2' is similar to that of FIG. 11A, except the bottom of the bag B1' has another opening for a wire connecting the detachable battery DB to the electronic device ED. In FIG. 11C, the bags B1' and B2' are arranged side by side, so the wire can be easily connected between the detachable battery DB and the electronic device ED. Those skilled in the art should readily understand different arrangement for the bags on the inner part INN.

Briefly summarized, this present disclosure proposes a movable container with a novel structure for a detachable battery can be easily withdrawn. With a case made of a different material from the outer shell, the water proof effect can be greatly improved to protect the stuff (e.g., the detachable battery and the electronic device). Specifically, when the movable container is deformed by a collision, the case made of a material with relatively lower hardness and higher ductility can prevent from forming a crack to the case CSE so that the protection and waterproof can be improved. In addition, the zipper on the outer part OUT of the case may be a water proof zipper to improve the water proof effect. The case made of a material with lower hardness can effectively absorb the shock, especially when the movable container is moving, to protect the stuff stored therein from being damaged.

What is claimed is:

1. A movable container, comprising:
   an outer shell, wherein a surface of the outer shell comprises a first part and a second part, and a height deviation locates between the first part of the surface and the second part of the surface toward a normal direction of the surface;
   a handle tube, extending outwardly from the second part of the surface and located between the first part of the surface and the second part of the surface, wherein a part of a handle of the movable container is embedded in the handle tube; and
   a case, detachably attached to the handle tube and the second part of the surface of the outer shell via an attachment mechanism, wherein the case is arranged to accommodate a detachable battery providing current;
   a sensing device, driven by the current from the detachable battery, including:
      an image sensor, positioned on the handle and arranged to sense a distance feature and a recognition feature, wherein the movable container uses the distance feature and the recognition feature to follow a target; and
      a proximity sensor, arranged to avoid an obstacle.

2. The movable container of claim 1, wherein the outer shell is made of a first material and the case is made of a second material, and a hardness of the second material is less than a hardness of the first material.

3. The movable container of claim 1, wherein the case includes an inner part and an outer part, the inner part is attached to the second part of the surface and the handle tube via the attachment mechanism, and outer part is attached to the first part of the surface.

4. The movable container of claim 1, further comprising:
a detachable power supply device, covered by the case and fixed by an elastic band.

5. The movable container of claim 4, further comprising:
a plurality of motors arranged to provide a momentum to the movable container; and
a power distribution board coupled to the plurality of motors and the detachable power supply device; wherein a wire between the power distribution board and the detachable power supply device go through an opening.

6. The movable container of claim 5, wherein the opening is located on the second part of the surface.

7. The movable container of claim 5, wherein the opening is cut through between the second part of the surface and the case.

8. The movable container of claim 7, wherein the opening is located on the handle tube.

9. The movable container of claim 4, further comprising:
a power distribution board coupled to the sensing device and the detachable power supply device; wherein a wire between the power distribution board and the detachable power supply device go through an opening.

10. The movable container of claim 1, wherein the image sensor is located on another surface of the movable container or on a top of the handle.

11. The movable container of claim 1, further comprising:
a processing circuit, electrically connected to the sensing device, wherein the processing circuit is arranged to process the recognition feature; and
an electronic device, covered by the case and fixed by an elastic band, and electrically connected to the detachable power supply device and the sensing device, wherein the electronic device is arranged to provide an additional computing power.

12. The movable container of claim 1, wherein the handle is a single rod handle, and the single rod handle separates the second part of the surface.

13. The movable container of claim 1, the attachment mechanism comprises an adhesive.

* * * * *